United States Patent
Weinländer

(10) Patent No.: US 6,527,190 B1
(45) Date of Patent: Mar. 4, 2003

(54) CHIP CARD WITH MEMORY FOR PROGRAMS WHICH CAN BE RELOADED AS A FUNCTION OF THE APPLICATION

(75) Inventor: Markus Weinländer, Happurg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/508,287

(22) PCT Filed: Aug. 27, 1998

(86) PCT No.: PCT/DE98/02530

§ 371 (c)(1),
(2), (4) Date: Jun. 1, 2000

(87) PCT Pub. No.: WO99/13430

PCT Pub. Date: Mar. 18, 1999

(30) Foreign Application Priority Data

Sep. 9, 1997 (DE) .................................... 197 39 545

(51) Int. Cl.[7] ............................................... G06K 19/00
(52) U.S. Cl. .................. 235/487; 235/492; 711/101
(58) Field of Search ......................... 235/380, 379, 235/492, 487; 711/163, 153, 202, 101

(56) References Cited

U.S. PATENT DOCUMENTS 4,777,355 A  * 10/1988 Takahira
4,829,169 A  *  5/1989 Watanabe
5,241,634 A  *  8/1993 Suzuki
5,542,081 A  *  7/1996 Geronimi
5,625,791 A  *  4/1997 Farrugia et al.
5,829,013 A  * 10/1998 Hasbun
5,991,858 A  * 11/1999 Weinlander

FOREIGN PATENT DOCUMENTS

EP          583.006      *  2/1994
WO       WO 96/28782    *  9/1996

* cited by examiner

*Primary Examiner*—Diane I. Lee
(74) *Attorney, Agent, or Firm*—Fish & Richardson P.C.

(57) ABSTRACT

A chip card has a program execution unit and a memory for at least one program that can be reloaded as a function of the application. In every reloadable program, first command instructions having absolute address parameters that refer to memory areas not occupied by the reloadable program are separated from second command instructions having absolute address parameters that refer to the memory area occupied by the reloadable program. It is possible for the reloadable program to be reloaded as a function of the application at any desired start address in the memory and to be adapted to that start address by the program execution unit. In particular, the need to create different reloadable program versions for possible application-related start addresses is dispensed with.

7 Claims, 2 Drawing Sheets

CHIP CARD WITH MEMORY FOR PROGRAMS WHICH CAN BE RELOADED AS A FUNCTION OF THE APPLICATION

BACKGROUND INFORMATION

Chip cards frequently have a data memory which, for example, is organized in the form of a hierarchical file system and which is provided, in particular, in the form of an EEPROM memory module. In addition, the data memory of chip cards serves, in particular, also as a memory for programs which can be reloaded as a function of the application. The reloading of programs after the chip card has been manufactured, and in particular after it has been personalized or initialized permits subsequent reloading of, in particular, program routines or files, such as for example encryption algorithms, which only the application provider of the chip card, and not the manufacturer of the chip card, knows. Programs for fault recovery or expansion routines, in particular for the operating system of the chip card, can also be reloaded subsequently. For example, the need to carry out costly reengineering of a ROM memory module with a faulty chip card operating system can thus be dispensed with because program routines for fault correction can be reloaded. For example, application and user programs can also be reloaded as a function of the application.

In the case of chip cards, there exits the problem here that only command instructions with absolute address parameters are available for the programs which are as a rule created at the chip card programming code level, in particular at the machine command level. These are command instructions with an absolute memory address system in which the access address in the memory of the chip card is specified directly and which is independent of the memory address of the corresponding command instruction itself. In the chip card, the command instructions which are generally used in PC systems and which have a relative memory addressing system are not at all available, or available only to a very restricted extent, with the result that in the case of programs for chip cards it is necessary to resort to accessing command instructions with an absolute memory addressing system. Such command instructions in the case of chip cards with absolute address parameters are, in particular, jump instructions, shift instructions or address instructions, for example the so-called 'MOV_DPTR', '#adrs', 'LCALL_adrs' or 'LJMP_adrs' command instructions.

When a reloadable program is created with command instructions with absolute address parameters for a chip card it is therefore necessary for the memory area which is provided to be known, in particular for the start address, at which the program is to be reloaded, to be known.

If the program is to be stored at a different location in the memory, it is necessary to adapt specific command instructions with absolute address parameters. There are, in particular, two groups of command instructions with absolute address parameters available for this. A first group of these command instructions is independent of the memory area which the program in the memory occupies, in particular because the address parameters refer to memory areas which are not occupied by the reloadable program, for example to the operating system of the chip card. On the other hand, a second group of these command instructions is dependent on the memory area which the program occupies in the memory, in particular because the address parameters refer to the memory area which is occupied by the reloadable program. If the program is shifted, the address parameters of the second group of command instructions are adapted, while the address parameters of the first group of command instructions must remain unchanged.

A problem is that command instructions with absolute address parameters of the memory area of the reloadable program in the memory can be either independent or dependent. The distinction for command instructions with absolute address parameters between the first and Second group is not dependent on the type of the respective command instruction here. The disadvantageous possibility is known that, during the actual creation of a reloadable program for chip cards, a specific version of the corresponding reloadable program, which takes into account its respective application-dependent arrangement in the memory of the chip card, is created for any foreseeable application which can be provided.

It is particularly disadvantageous that such an adaptation of the program to its application-dependent memory area assignment in the memory of the chip card can, generally, not be performed in particular by the user himself because the user frequently does not know the structure of the reloadable program, or is also not supposed to know it at all. In particular, it is necessary for complicated revision of the program to be performed "manually" or with specific compilers or interpreters by the manufacturer of the reloadable program.

SUMMARY

An object of the present invention is to provide a chip card with programs which can be reloaded as a function of the application and which permits a more advantageous adaptation of the respective program to its application-dependent memory area assignment in the memory of the chip card.

An advantage of the chip card according to the preset invention is that during the creation of a reloadable program which has command instructions with absolute address parameters, it is only necessary to create a single program version. This basic version of the program can then be reloaded into the memory of the chip card as a function of the application, and in particular can be installed or configured by means of the chip card itself, i.e., can be adapted to the memory area which is occupied as a function of the application.

It is particularly advantageous that the memory area which is occupied by the reloadable program can, according to the invention, preset have at least a first memory element and a second memory element for separating at least the command instructions with absolute address parameters, which refer to the memory area occupied by the program, and the memory areas which are not occupied by the program. Thus, the necessary adaptation of the reloadable program to the memory area occupied by it, i.e., the necessary adaptation of the program in particular to its application-dependent start address, can advantageously be carried out completely by the program execution unit of the chip card. To reload a program, a user of the chip card thus advantageously requires no detailed knowledge of the program structure, with the result that, in particular, it is possible to reload even programs which relate to the security of the chip card and whose internal structures are not supposed to be known to the user.

DETAILED DESCRIPTION

Figure 1:
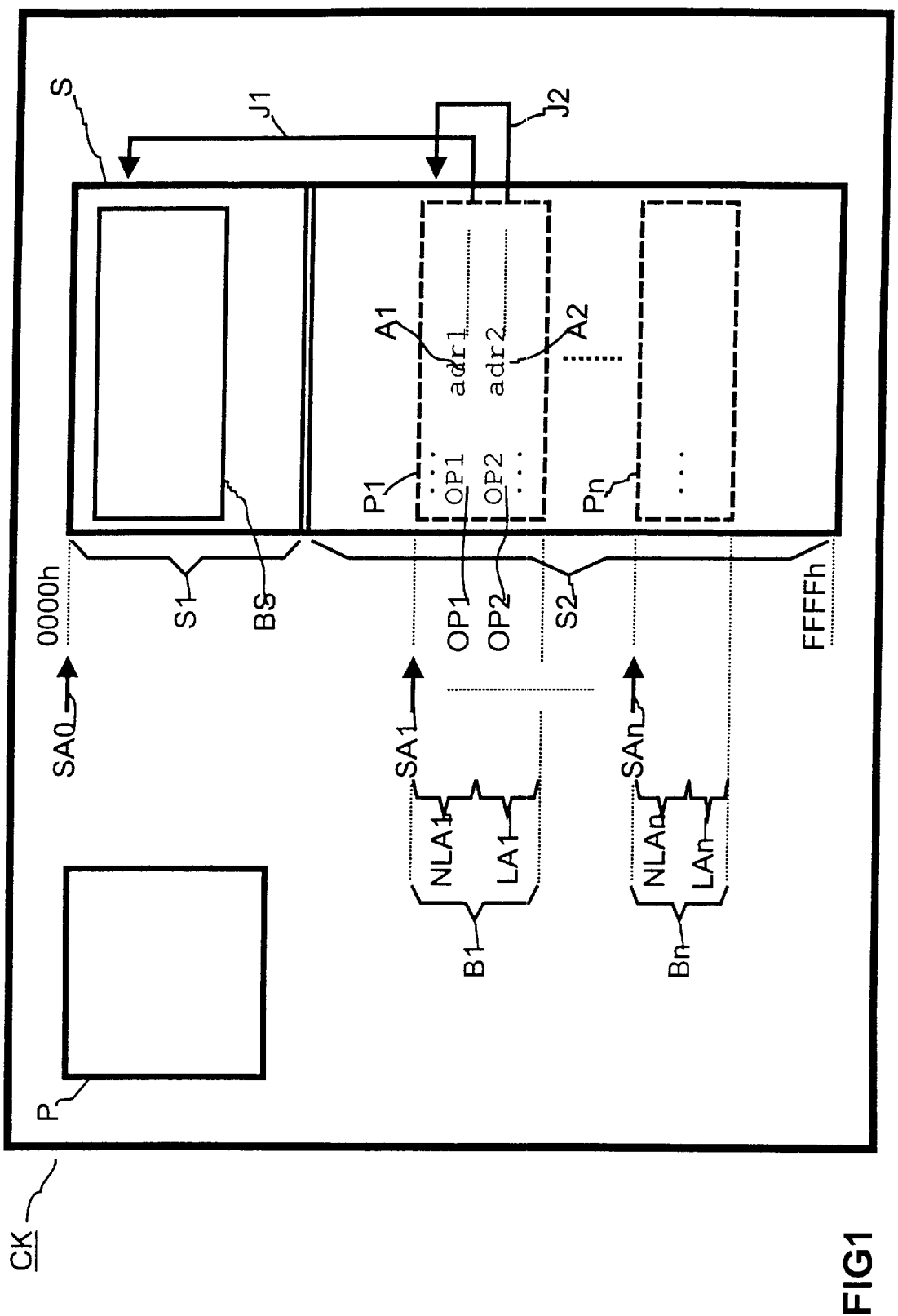
FIG. 1 shows a schematic view of the structure of the chip card according to the preset invention with program execution unit and memory in which programs which can be reloaded as a function of the application are stored, the programs having first and second command instructions with absolute address parameters.

FIG. 1 illustrates, by way of example, a schematic view of the structure of the chip card CK according to the preset invention with a program execution unit P and a memory S. The memory S has at least one program which can be reloaded as a function of the application, the programs which are designated by the references P1 to Pn and which are reloaded into the memory S as a function of the application being illustrated in FIG. 1 by way of example. Each of the reloadable programs P1 to Pn occupies, in the reloaded state in the memory S, a specific memory area B1 to Bn, each of which has, in particular, a start address SA1 to SAn. The preset invention will be described below, in particular with respect to the example of the reloadable program P1.

The reloadable program P1 has first command instructions, designated by OP1, with absolute address parameters A1 which refer to memory areas which are not occupied by the reloadable program P1 to Pn. For example, for the reloadable program P1 which is illustrated in FIG. 1 these are those memory areas of the memory S which are located outside the memory area B1. The absolute addressing reference of the first command instructions OP1 which are requested by means of the address parameters A1 is illustrated in FIG. 1, by way of example, with the arrow J1.

Furthermore, the reloadable program P1 has second command instructions, designated by OP2, with absolute address parameters A2 which refer to the memory area B1 which is occupied by the reloadable program P1. The absolute addressing reference of the second command instructions OP2, which is requested by means of the address parameter A2, is illustrated in FIG. 1, by way of example, with the arrow J2.

Figure 2:
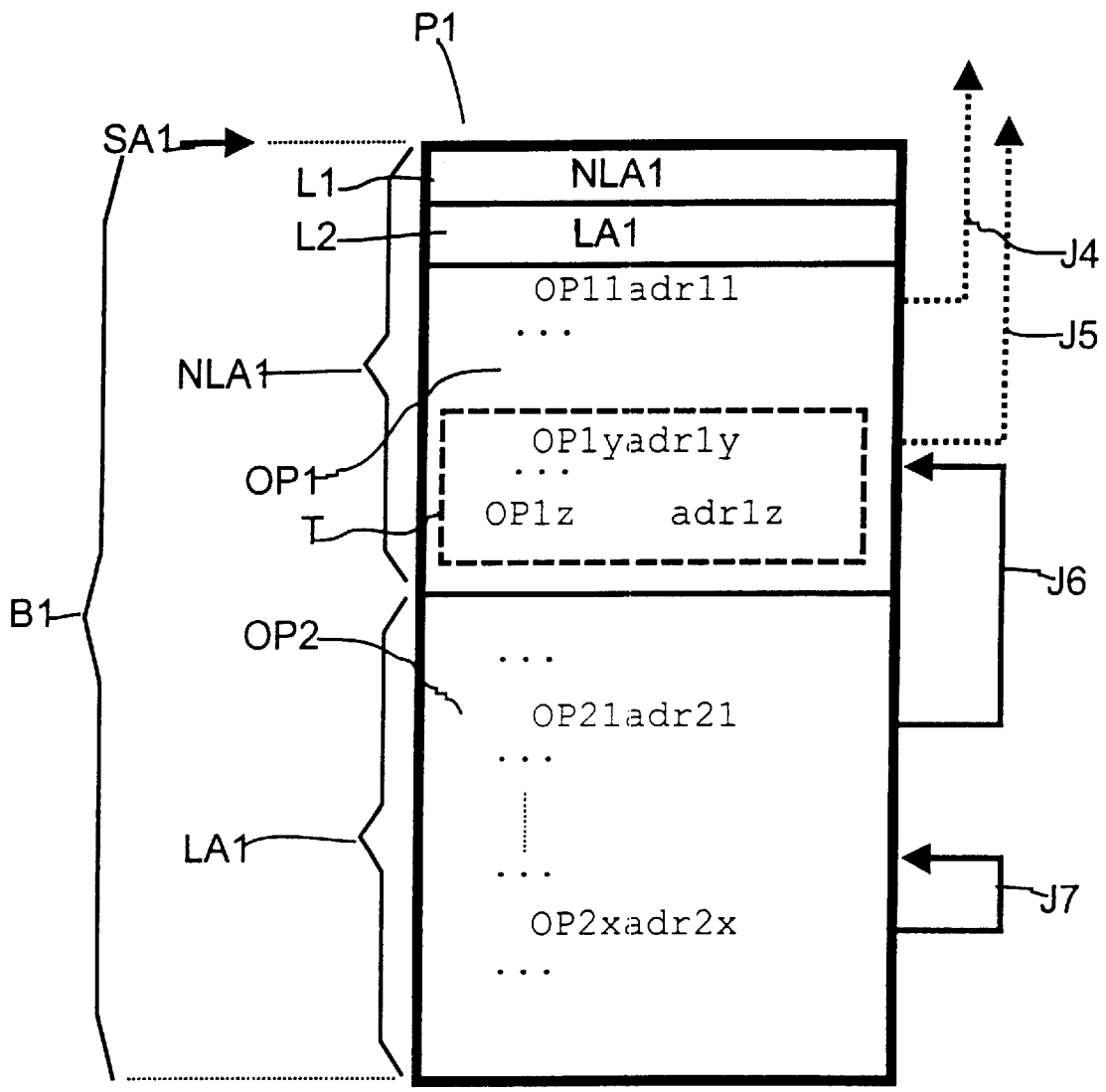
FIG. 2 shows a schematic view of the structure of a reloadable program whose first and second command instructions are separated in the first and second memory elements of the memory area which is occupied by the reloadable program.

In FIG. 2, a reloadable program P1 of the chip card CK according to the preset invention is illustrated by way of example, said program P1 occupying the memory area B1 in the memory S of the chip card CK according to the preset invention. The first and second command instructions, which have the respective references OP1 and OP2 in FIG. 1, have, by way of example, in FIG. 2 the references OP11 to OP1z and OP21 to OP2x, respectively, with the absolute Address parameters adr11 to adr1z and adr21 to adr2x, respectively. The memory area B1 which is occupied by the reloadable program P1 in the memory S has, according to the preset invention, a first memory element NLA1 and at least one second memory element LA1. Here, according to the preset invention the first command instructions OP11 to OP1z whose absolute address parameters adr11 to adr1z refer to memory areas which are not occupied by the reloadable program P1 are arranged in the first memory element NLA1. Addressing references of the first command instructions OP11 and OP1y to memory areas which are not occupied by the reloadable program P1 are illustrated in FIG. 2, by way of example, with the arrows J4 and J5, respectively. The second command instructions OP21 to OP2x whose absolute address parameters adr21 to adr2x refer to the memory area B1 which is occupied by the reloadable program P1 are, according to the preset invention arranged in the second memory element LA1. Addressing references of the second command instructions OP21 and OP2x to the memory area B1 which is occupied by the reloadable program P1 are illustrated in FIG. 2 by way of example with the arrows J6 and J7, respectively.

The structure of the reloadable program P1 which is illustrated in FIG. 2 in schematic form is capable of being transferred to the programs P1 to Pn which are illustrated in FIG. 1, can be reloaded according to the preset invention and occupy the memory areas B1 to Bn in the memory S. The memory areas B1 to Bn have the first and second memory elements NLA1 to NLAn and LA1 to LAn, respectively, which are illustrated in FIG. 1.

The preset invention will be explained in more detail with reference to the example of an embodiment illustrated in FIG. 2. Here, according to the preset invention, the program execution unit P adapts, for example, those address parameters adr21 to adr2x of the second command instructions OP21 to OP2x which are arranged in the second memory element LA1 during the reloading of the program P1 into the memory area B1 which is occupied as a function of the application. As a result of the advantageous sorting between the first and second command instructions OP11 to OP1z and OP21 to OP2x, respectively, which occurs according to the preset invention, only those address parameters adr21 to adr2x of the second command instructions OP21 to OP2x which are arranged in the second memory element LA1 have to be adapted. The adaptation of the second command instructions OP21 to OP2x is carried out, in particular, as a function of the start address SA1 of the memory area B1 which is occupied by the reloaded program P1. On the other hand, the program execution unit P does not perform any adaptation for those address parameters adr11 to adr1z of the first command instructions OP11 to OP1z which are arranged in the first memory element NLA1 because said address parameters adr11 to adr1z refer to memory areas outside the memory area B1.

For example, before the reloading, the program P1 is initially created in hexadecimal form 0000h for the start address. After the reloading of the program P1 to the application-dependent start address SA1, the program execution unit P adds the value of the start address SA1 globally to all those address parameters adr21 to adr2x of the second command instructions OP21 to OP2x which are arranged in the second memory element LA1. As a result, the absolute addressing references of the address parameters adr21 to adr2x, and thus the operational capability of the program P1, are maintained.

Owing to the programming relationship, in particular semantic relationship, between command instructions in a program, it may, in particular, be necessary also to be able to access memory areas outside the occupied memory area B1 from the part of the reloadable program P1 which is stored in the second memory element LA1. In one advantageous embodiment of the present invention, a programming access is carried out by second command instructions OP21 to OP2x in the second memory element LA1 to memory areas which are not occupied by the reloadable program P1, by means of the first command instructions OP1 to OP1z arranged in the first memory element NLA1. This is explained below with reference to the example of a second command instruction OP21 which has the reference OP21. The absolute address parameters adr21 of the second command instruction OP21 which is arranged in the second memory element LA1 refer here to a first command instruction OP1y which is arranged in the first memory element NLA1, as is illustrated in FIG. 2, by way of example, by the arrow J6. The absolute address parameters adrly of the respective first command instruction OP1y refer to the memory areas i.e. in particular to that memory address of the memory S to which the programming access is to be made, as is illustrated in FIG. 2, by way of example, by the arrow J5. In particular, a jump table T with first command instruction OP1y to OP1z is advantageously arranged in the first memory element NLA1, by means of which a programming access of second command instructions OP21 to OP2x which are arranged in the second memory element LA1 can be made to memory areas which are not occupied by the reloadable program P1, these being, for example, memory areas of the chip card at which operating system routines are stored.

Further advantageous embodiments of the invention are described in more detail below with areference to FIGS. 1 and 2.

In a further advantageous embodiment of the invention, the memory S of the chip card CK has a first memory subdivision S1 to which the address parameters A1 of the first command instructions OP1 of the reloadable programs P1 to Pn refer. Furthermore, the memory S advantageously has at least one second memory subdivision S2 in which the memory area B1 to Bn occupied by the reloadable programs P1 to Pn is located. In particular, an operating system program BS of the chip card CK is preferably stored in the first memory subdivision S1 of the memory S. The first memory subdivision S1 and the second memory subdivision S2 are, in particular, physically different memories of the chip card CK, for example a read-only memory in the form of a ROM module or a read/write memory in the form of an EEPROM module. While, for example, the operating system program BS can already be stored in the first memory subdivision S1 of the memory S during the manufacture of the chip card CK, the programs P1 to Pn can be subsequently reloaded into the second memory subdivision S2 as a function of the application. Independently of the first and second memory subdivision S1 and S2, respectively, the memory S of the chip card CK can advantageously have comprehensive memory addressing a system, for example from hexadecimal 0000h to hexadecimal FFFFh.

In one advantageous embodiment of the preset invention, at least the magnitude of the first memory elements NLA1 to NLAn of the memory areas B1 to Bn which are occupied by the reloadable programs P1 to Pn are stored in the memory S of the chip card. The magnitude of the first memory element NLA1 to NLAn is advantageously stored in the respective, occupied memory area B1 to Bn, as is illustrated in FIG. 2 by way of example for the program P1 with the reference L1. Furthermore, it is, in particular, also possible to store the magnitude of the second memory element LA1 to LAn, as is illustrated in FIG. 2 by way of example for the program P1 with the reference L2.

What is claimed is:

1. A chip card, comprising:
   a program execution unit;
   a memory for a reloadable program, the reloadable program being reloaded as a function of an application, the reloadable program occupying a specific memory area in the memory when in a reloaded state, the reloadable program having
      first command instructions with first absolute address parameters, the first absolute address parameters referring to areas in the memory which are not occupied by the reloadable program, and
      second command instructions with second absolute address parameters, the second absolute address parameters referring to the memory area occupied by the reloadable program,
   the memory area occupied by the reloadable program having a first memory element and at least one second memory element, the first command instructions being arranged in the first memory element, the second command instructions being arranged in the second memory element, the program execution unit adapting the second absolute address parameters of the second command instructions when the reloadable program is reloaded into the memory area which is occupied as a function of the application.

2. The chip card according to claim 1, wherein the second absolute address parameters of the second command instructions are adapted as a function of a start address of the memory area which is occupied by the reloadable program.

3. The chip card according to claim 1, wherein a programming access by at least one of the second command instructions to the areas in the memory that are not occupied by the reloadable program is effected by
   the second absolute address parameters of the second command instructions arranged in the second memory element referring to corresponding ones of the first command instructions that are arranged in the first memory element, and
   the first absolute address parameters of the corresponding first command instructions that are arranged in the first memory element referring to the memory areas at which the programming access is to be effected.

4. The chip card according to claim 1, wherein:
   the memory has a first memory subdivision to which the first absolute address parameters of the first command instructions of the reloadable program refer; and
   the memory further has at least a second memory subdivision in which the memory area which is occupied by the reloadable program is located.

5. The chip card according to claim 4, wherein an operating system program of the chip card is stored in the first memory subdivision.

6. The chip card according to claim 4, wherein the first memory subdivision and the second memory subdivision are physically different memories of the chip card.

7. The chip card according to claim 1, wherein a level of storage occupancy of the first memory element of the memory area is stored in the memory.

* * * * *